United States Patent
Nagatomo et al.

(10) Patent No.: US 10,804,086 B2
(45) Date of Patent: Oct. 13, 2020

(54) APPARATUS AND METHOD FOR PROCESSING OF MASS SPECTROMETRY DATA

(71) Applicant: JEOL Ltd., Tokyo (JP)

(72) Inventors: Kenji Nagatomo, Tokyo (JP); Masaaki Ubukata, Tokyo (JP); Ayumi Kubo, Tokyo (JP)

(73) Assignee: JEOL Ltd., Tokyo (JP)

( * ) Notice: Subject to any disclaimer, the term of this patent is extended or adjusted under 35 U.S.C. 154(b) by 0 days.

(21) Appl. No.: 16/208,714

(22) Filed: Dec. 4, 2018

(65) Prior Publication Data

US 2019/0172695 A1    Jun. 6, 2019

(30) Foreign Application Priority Data

Dec. 5, 2017 (JP) ................. 2017-233055

(51) Int. Cl.
*G01N 30/72* (2006.01)
*H01J 49/00* (2006.01)

(52) U.S. Cl.
CPC .......... *H01J 49/0036* (2013.01); *G01N 30/72* (2013.01); *H01J 49/0045* (2013.01)

(58) Field of Classification Search
CPC ... G01N 30/72; H01J 49/0036; H01J 49/0045
See application file for complete search history.

(56) References Cited

U.S. PATENT DOCUMENTS

| 2008/0001079 A1* | 1/2008 | Wang | H01J 49/0036 |
| | | | 250/282 |
| 2008/0067344 A1* | 3/2008 | Yamaguchi | G16C 20/20 |
| | | | 250/282 |

(Continued)

FOREIGN PATENT DOCUMENTS

JP    2013190216 A    9/2013

OTHER PUBLICATIONS https://techterms.com/definition/matrix, published Jul. 2, 2013, retrieved Aug. 13, 2019 (Year: 2013).*

(Continued)

*Primary Examiner* — Wyatt A Stoffa
(74) *Attorney, Agent, or Firm* — The Webb Law Firm

(57) ABSTRACT

There is provided a mass spectrometry data processor allowing for easy selection of a compositional formula for a sample component to be analyzed (analyte) even in general mass spectrometry applications. The mass spectrometry data processor is used to perform a qualitative analysis of the sample component based both on a first mass spectrum obtained by ionizing the sample component by a soft ionization method and on a second mass spectrum generated by cleavage of the sample component. The data processor includes: a molecular ion peak detector for detecting one molecular ion peak from the first mass spectrum; a fragment ion peak detector for detecting plural fragment ion peaks from the second mass spectrum; a composition estimator for obtaining estimated compositional formulas for the sample component from the molecular ion peak and obtaining estimated compositional formulas for fragments constituting the sample component from the fragment ion peaks; an assignment validity decision device for making decisions as to whether the estimated compositional formulas for the fragments can be assigned to the estimated compositional formulas for the sample component; and a degree of coincidence computing section for computing degrees of coincidence of the estimated compositional formulas for the fragments with the estimated compositional formulas for the analyte based on results of the decisions made by the assignment validity decision device.

6 Claims, 16 Drawing Sheets

| Order | Candidate compositional formulas (1) [m/z] 287.94912 | Degree of coincidence (%) |
|---|---|---|
| 1 | C12H7O2Cl3 | 96.15 |
| 2 | C10H5N3OCl3 | 88.46 |
| 3 | C7H8N4Cl4 | 84.62 |
| 4 | C6H12O4Cl4 | 80.77 |
| 5 | C6H13N2Cl5 | 80.77 |
| 6 | C7H7N2O4Cl3 | 73.08 |
| 7 | C8H2N4O4Cl2 | 46.15 |
| 8 | C13H2N2O2Cl2 | 34.62 |
| 9 | C18H2Cl2 | 30.77 |

(56) References Cited

U.S. PATENT DOCUMENTS

| | | | |
|---|---|---|---|
| 2008/0121793 A1* | 5/2008 | Yamaguchi | H01J 49/0027 250/282 |
| 2008/0300795 A1* | 12/2008 | Sadygov | G01N 33/6848 702/19 |
| 2010/0057372 A1* | 3/2010 | Fagerquist | G01N 33/6851 702/20 |
| 2013/0282304 A1* | 10/2013 | Kozawa | H01J 49/0036 702/27 |
| 2014/0045273 A1* | 2/2014 | Cerda | G16C 20/20 436/173 |
| 2014/0183353 A1* | 7/2014 | Shimada | H01J 49/022 250/282 |
| 2014/0249765 A1 | 9/2014 | Morimoto | |
| 2015/0160231 A1* | 6/2015 | Meitei | H01J 49/0036 702/22 |
| 2015/0340216 A1* | 11/2015 | Kwiecien | H01J 49/0036 250/282 |
| 2017/0092476 A1* | 3/2017 | Duchoslav | H01J 49/0036 |
| 2018/0040463 A1* | 2/2018 | Savitski | H01J 49/0045 |
| 2019/0214238 A1* | 7/2019 | Richardson | H01J 49/025 |

OTHER PUBLICATIONS

Extended European search report issued in EP18209839.2 dated Apr. 4, 2019.

\* cited by examiner

| No. | Candidate compositional formulas (1) [m/z] 287.94912 |
|---|---|
| 1 | C13H2N2O2Cl2 |
| 2 | C7H8N4Cl4 |
| 3 | C8H12O4Cl4 |
| 4 | C12H7O2Cl3 |
| 5 | C6H13N2Cl5 |
| 6 | C7H7N2O4Cl3 |
| 7 | C18H2Cl2 |
| 8 | C8H2N4O4Cl2 |
| 9 | C10H5N3OCl3 |

| No. | [m/z] | Candidate compositional formulas (2) |
|---|---|---|
| 1 | 50.01646 | C4H2 |
| 2 | 51.02427 | C4H3 |
| 3 | 62.01654 | C5H2 |
| 4 | 63.02428 | C5H3 |
| 5 | 72.98534 | C3H2Cl |
| 6 | 74.01560 | C6H2 |
| 7 | 75.02403 | C6H3 |
| 8 | 79.01914 | C2H6NCl<br>C5H3O<br>C3HN3 |
| 9 | 85.99287 | C4H3Cl |
| 10 | 97.99311 | C5H3Cl |
| 11 | 99.00068 | C5H4Cl |
| 12 | 108.98547 | C6H2Cl |
| 13 | 113.98774 | C2H6NCl2<br>C5H3OCl<br>C3HN3Cl |
| 14 | 114.99594 | C2H7NCl2<br>C5H4OCl<br>C3H2N3Cl |
| 15 | 125.98780 | C3H6NCl2<br>C6H3OCl<br>C4HN3Cl |
| 16 | 126.04761 | C10H6 |
| 17 | 132.98253 | C5H3Cl2 |
| 18 | 142.99051 | C3H7NOCl2<br>C6H4O2Cl<br>CH5N4Cl2<br>C4H2N3OCl |
| 19 | 144.96444 | C3N3O2Cl |
| 20 | 145.96940 | C6H4Cl2 |
| 21 | 161.96435 | C3H7NCl3<br>C6H4OCl2<br>C4H2N3OCl2 |
| 22 | 162.02386 | C10H7Cl<br>C11H2N2 |
| 23 | 189.01161 | C8H9NCl2<br>C11H6OCl<br>C9H4N3Cl |
| 24 | 218.01364 | C9H10NOCl2<br>C6H13N2Cl3<br>C12H7O2Cl<br>C18H2<br>C7H8N4Cl2<br>C10H5N3OCl<br>C13H2N2O2<br>C6H12O4Cl2 |
| 25 | 251.97448 | C9H9NOCl3<br>C6H12N2Cl4<br>C12H6O2Cl2<br>C7H7N4Cl3<br>C18HCl<br>C10H4N3OCl2<br>C13HN2O2Cl<br>C6H11O4Cl3 |
| 26 | 252.98272 | C6H13N2Cl4<br>C9H10NOCl3<br>C12H7O2Cl2<br>C18H2Cl<br>C7H8N4Cl3<br>C10H5N3OCl2<br>C13H2N2O2Cl |

| Order | Candidate compositional formulas (1) [m/z] 287.94912 | Degree of coincidence (%) |
|---|---|---|
| 1 | C12H7O2Cl3 | 96.15 |
| 2 | C10H5N3OCl3 | 88.46 |
| 3 | C7H8N4Cl4 | 84.62 |
| 4 | C6H12O4Cl4 | 80.77 |
| 5 | C6H13N2Cl5 | 80.77 |
| 6 | C7H7N2O4Cl3 | 73.08 |
| 7 | C8H2N4O4Cl2 | 46.15 |
| 8 | C13H2N2O2Cl2 | 34.62 |
| 9 | C18H2Cl2 | 30.77 |

FIG.8

| Order | Candidate compositional formulas (1) [m/z] 140.158 |
|---|---|
| 1 | C10H20 |
| 2 | C9H18N |
| 3 | C8H16N2 |

| Order | Candidate compositional formulas (1) [m/z] 140.158+H2O |
|---|---|
| 1 | C10H22O |
| 2 | C9H20NO |
| 3 | C8H18N2O |

| No. | [m/z] | Candidate compositional formulas (2) |
|---|---|---|
| 1 | 53.040 | C4H5 |
| 2 | 54.047 | C4H6 |
| 3 | 55.055 | C4H7 |
| 4 | 57.035 | C3H5O |
| | | CH3N3 |
| 5 | 67.055 | C5H7 |
| | | H7N2O2 |
| 6 | 68.063 | C5H8 |
| 7 | 69.071 | C5H9 |
| 8 | 70.078 | C5H10 |
| 9 | 82.078 | C6H10 |
| 10 | 83.086 | C6H11 |
| 11 | 97.102 | C7H13 |
| 12 | 111.117 | C8H15 |
| 13 | 112.125 | C8H16 |

| No. | [m/z] | (2) \ (1) | 1<br>C10H20 | 2<br>C9H18N | 3<br>C8H16N2 |
|---|---|---|---|---|---|
| 1 | 53.040 | C4H5 | 1 | 1 | 1 |
| 2 | 54.047 | C4H6 | 1 | 1 | 1 |
| 3 | 55.055 | C4H7 | 1 | 1 | 1 |
| 4 | 57.035 | C3H5O / CH3N3 | 0 | 0 | 0 |
| 5 | 67.055 | C5H7 / H7N2O2 | 1 | 1 | 1 |
| 6 | 68.063 | C5H8 | 1 | 1 | 1 |
| 7 | 69.071 | C5H9 | 1 | 1 | 1 |
| 8 | 70.078 | C5H10 | 1 | 1 | 1 |
| 9 | 82.078 | C6H10 | 1 | 1 | 1 |
| 10 | 83.086 | C6H11 | 1 | 1 | 1 |
| 11 | 97.102 | C7H13 | 1 | 1 | 1 |
| 12 | 111.117 | C8H15 | 1 | 1 | 1 |
| 13 | 112.125 | C8H16 | 1 | 1 | 1 |
| | | Degree of coincidence (%) | 92 | 92 | 92 |

FIG. 14A

| No. | [m/z] | (2) \ (1) | 1<br>C10H22O | 2<br>C9H20NO | 3<br>C8H18N2O |
|---|---|---|---|---|---|
| 1 | 53.040 | C4H5 | 1 | 1 | 1 |
| 2 | 54.047 | C4H6 | 1 | 1 | 1 |
| 3 | 55.055 | C4H7 | 1 | 1 | 1 |
| 4 | 57.035 | C3H5O / CH3N3 | 1 | 0 | 0 |
| 5 | 67.055 | C5H7 / H7N2O2 | 1 | 1 | 1 |
| 6 | 68.063 | C5H8 | 1 | 1 | 1 |
| 7 | 69.071 | C5H9 | 1 | 1 | 1 |
| 8 | 70.078 | C5H10 | 1 | 1 | 1 |
| 9 | 82.078 | C6H10 | 1 | 1 | 1 |
| 10 | 83.086 | C6H11 | 1 | 1 | 1 |
| 11 | 97.102 | C7H13 | 1 | 1 | 1 |
| 12 | 111.117 | C8H15 | 1 | 1 | 1 |
| 13 | 112.125 | C8H16 | 1 | 1 | 1 |
| | | Degree of coincidence (%) | 100 | 92 | 92 |

FIG. 14B

| Order | Candidate compositional formulas (1) [m/z] 140.158 | Degree of coincidence (%) |
|---|---|---|
| 1 | C10H20 | 92 |
| 2 | C9H18N | 92 |
| 3 | C8H16N2 | 92 |

FIG. 15A

| Order | Candidate compositional formulas (1) [m/z] 140.158+H2O | Degree of coincidence (%) |
|---|---|---|
| 1 | C10H22O | 100 |
| 2 | C9H20NO | 92 |
| 3 | C8H18N2O | 92 |

FIG. 15B

| No. | Candidate compositional formulas (1) [m/z] 304.191 |
|---|---|
| 1 | C18H26NO3 |
| 2 | C13H26N3O5 |

| No. | Candidate compositional formulas (1) [m/z] 304.191 − C2H5 |
|---|---|
| 1 | C16H21NO3 |
| 2 | C11H21N3O5 |

| No. | [m/z] | Candidate compositional formulas (2) |
|---|---|---|
| 1 | 55.04265 | C3H5N |
| 2 | 126.12873 | C8H16N |
| 3 | 149.02342 | C8H5O3 |
| | | C6H3N3O2 |
| | | C11H3N |
| | | C3H5N2O5 |
| 4 | 204.07910 | C12H12O3 |
| | | C15H10N |
| | | C10H10N3O2 |
| 5 | 232.09782 | C13H14NO3 |
| | | C16H12N2 |
| | | C11H12N4O2 |

| No. | [m/z] | (2) \ (1) | 1<br>C18H26NO3 | 2<br>C13H26N3O5 |
|---|---|---|---|---|
| 1 | 55.04265 | C3H5N | 1 | 1 |
| 2 | 126.12873 | C8H16N | 1 | 1 |
| 3 | 149.02342 | C8H5O3<br>C6H3N3O2<br>C11H3N<br>C3H5N2O5 | 1 | 1 |
| 4 | 204.07910 | C12H12O3<br>C15H10N<br>C10H10N3O2 | 1 | 1 |
| 5 | 232.09782 | C13H14NO3<br>C16H12N2<br>C11H12N4O2 | 1 | 1 |
| Degree of coincidence (%) | | | 100.00 | 100.00 |

FIG. 20A

| No. | [m/z] | (2) \ (1) | 1<br>C16H25NO3 | 2<br>C11H21N3O5 |
|---|---|---|---|---|
| 1 | 55.04265 | C3H5N | 1 | 1 |
| 2 | 126.12873 | C8H16N | 1 | 1 |
| 3 | 149.02342 | C8H5O3<br>C6H3N3O2<br>C11H3N<br>C3H5N2O5 | 1 | 1 |
| 4 | 204.07910 | C12H12O3<br>C15H10N<br>C10H10N3O2 | 1 | 1 |
| 5 | 232.09782 | C13H14NO3<br>C16H12N2<br>C11H12N4O2 | 1 | 0 |
| Degree of coincidence (%) | | | 100.00 | 80.00 |

FIG. 20B

| Order | Candidate compositional formulas (1) [m/z] 304.191 | Degree of coincidence (%) |
|---|---|---|
| 1 | C18H26NO3 | 100 |
| 1 | C13H26N3O5 | 100 |

FIG. 21A

| Order | Candidate compositional formulas (1) [m/z] 304.191-C2H5 | Degree of coincidence (%) |
|---|---|---|
| 1 | C16H21NO3 | 100 |
| 2 | C11H21N3O5 | 80 |

FIG. 21B

APPARATUS AND METHOD FOR PROCESSING OF MASS SPECTROMETRY DATA

BACKGROUND OF THE INVENTION

Field of the Invention

The present invention relates to an apparatus and method for processing of mass spectrometry data obtained by sequentially mass analyzing chromatographically separated sample components.

Description of Related Art

Chromatography/mass spectrometry techniques are analysis methods of obtaining a mass spectrum (MS spectrum) of each sample component by separating sample components in time by chromatography, sequentially ionizing the sample components, sorting the ionized components according to mass-to-charge ratio (m/z) by a mass analyzer, and detecting the ionized components. Among these techniques, tandem mass spectrometry is an analytical method consisting of sorting ions of a certain mass-to-charge ratio (m/z) as precursor ions, cleaving the sorted ions into product ions, and obtaining a mass spectrum (MS spectrum) of the product ions.

A mass spectrometer performing an analysis as described above is equipped with a data processor for analyzing mass spectra deriving from individual sample components. Analysis of the mass spectra permits quantitative and qualitative analysis of the sample. A data processor adapted for use in tandem mass spectrometry analysis is disclosed in JP-A-2013-190216 below.

In a tandem mass analysis, the data processor set forth in this patent document 1 extracts candidate compositional formulas for a compound of interest based on the mass-to-charge ratio of molecular ion peaks of the compound of interest on an $MS^1$ spectrum derived from the first stage of mass analysis and computes composition scores indicative of the degrees of coincidence with theoretical mass values. Also, the processor extracts candidate chemical structural formulas for the compound of interest, makes tentative assignments of the peaks of $MS^2$ to $MS^4$ spectra derived by the latter stage of mass spectrometry for each of the extracted candidate chemical structural formulas, and computes partial structures' scores indicative of their degrees of coincidence. Then, the processor computes total scores based on the compositional scores and partial structures' scores for all the candidate chemical structural formulas, arrays the candidate chemical structural formulas in accordance with the total scores, and displays the result on a display unit.

Patent Documents

Patent document 1: JP-A-2013-190216

Such a mass spectrometry data processor is restricted in application to tandem mass spectrometry and is designed without taking into account the application to general mass spectrometry.

SUMMARY OF THE INVENTION

Accordingly, it is an object of the present invention to provide an apparatus and method for processing mass spectrometry data in such a way that a compositional formula for a sample component under analysis can be easily selected even in general mass spectrometry applications.

This object is achieved in accordance with the teachings of the present invention by a mass spectrometry data processor adapted to perform a qualitative analysis of a sample component based both on a first mass spectrum obtained by ionizing the sample component by a soft ionization method and on a second mass spectrum generated by cleavage of the sample component. The mass spectrometry data processor comprises: a molecular ion peak detector for detecting one molecular ion peak from the first mass spectrum; a fragment ion peak detector for detecting a plurality of fragment ion peaks from the second mass spectrum; a composition estimator for obtaining estimated compositional formulas for the sample component from the molecular ion peak and obtaining estimated compositional formulas for fragments constituting the sample component from the fragment ion peaks; an assignment validity decision device for making decisions as to whether the estimated compositional formulas for the fragments can be assigned to the estimated compositional formulas for the sample component; and a degree of coincidence computing section for computing the degrees of coincidence of the estimated compositional formulas for the fragments with the estimated compositional formulas for the sample component based on results of the decisions made by the assignment validity decision device.

According to the present invention constructed as described so far, it is possible to provide an apparatus and method for processing mass spectrometry data such that a compositional formula for a sample component under analysis can be easily selected even in general mass spectrometry applications other than tandem mass spectrometry.

BRIEF DESCRIPTION OF THE DRAWINGS

FIG. 6 shows one example of displayed image or list of candidate compositional formulas (2) for fragments, the candidate list being determined and displayed according to the first embodiment.

FIG. 7 is a list of exemplary results of decisions made as to validity of assignment of the candidate compositional formulas (2) to the candidate compositional formulas (1) in accordance with the first embodiment.

FIG. 8 shows one example of displayed image or list of computed degrees of coincidence in accordance with the first embodiment.

FIGS. 14A and 14B shows lists of exemplary results of decisions made as to validity of assignment of the candidate compositional formulas (2) to the candidate compositional formulas (1) according to the second embodiment.

FIGS. 15A and 15B show examples of displayed images or lists of degrees of coincidence computed in accordance with the second embodiment.

FIGS. 20A and 20B show further examples of displayed lists of results of decisions made as to validity of assignment of candidate compositional formulas (2) to candidate compositional formulas (1) in accordance with the second embodiment.

FIGS. 21A and 21B show yet other examples of displayed images or lists of computed degrees of coincidence according to the second embodiment.

DESCRIPTION OF THE INVENTION

Figure 1:
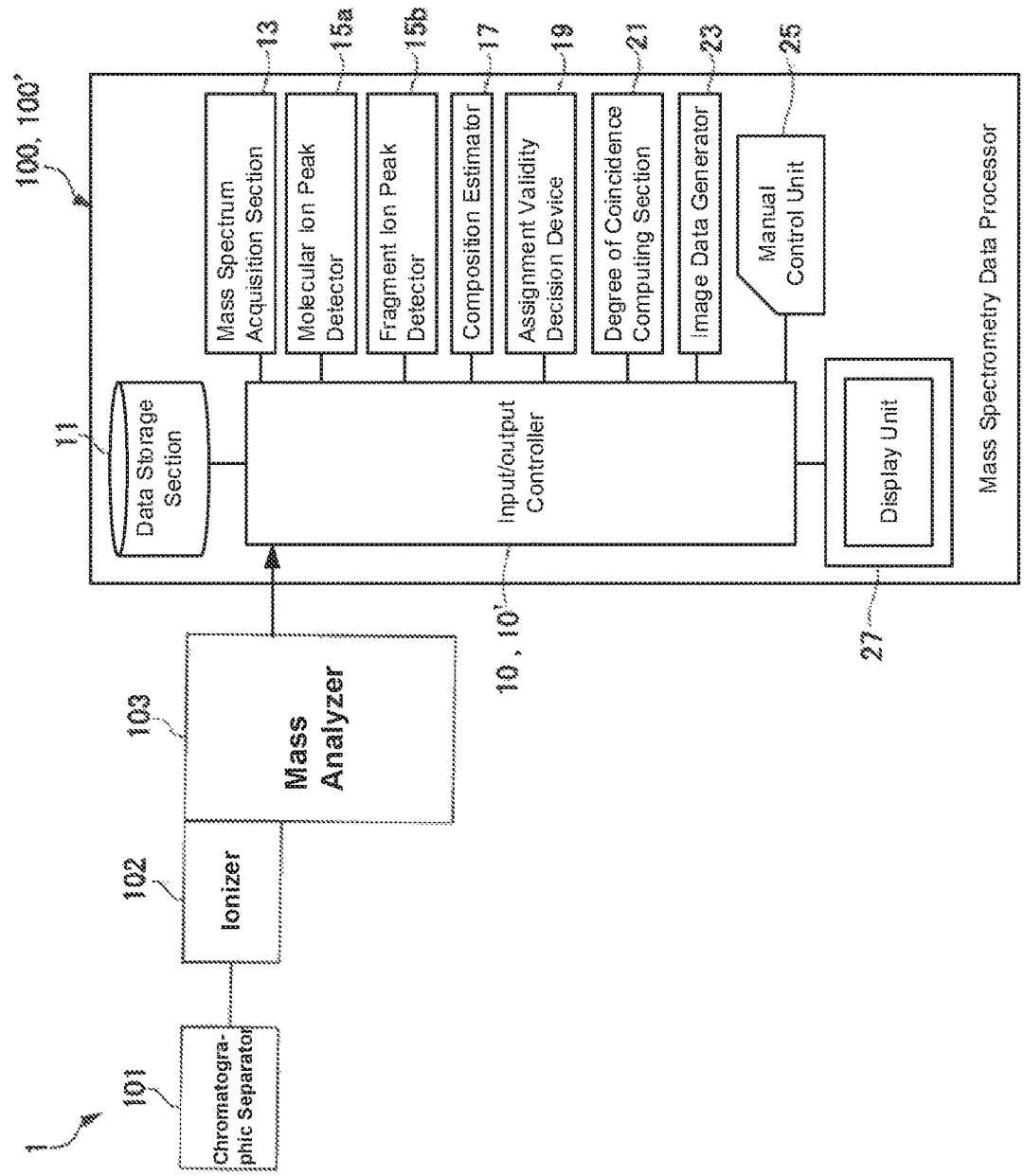
FIG. 1 is a schematic diagram of a mass spectrometer equipped with a mass spectrometry data processor associated with an embodiment of the present invention.

Embodiments of apparatus and method for processing mass spectrometry data in accordance with the present invention are hereinafter described in detail with reference to the accompanying drawings. Prior to description of the embodiments, the configuration of a mass spectrometer equipped with a mass spectrometry data processor is schematically described by referring to FIG. 1. In all the embodiments, identical components are indicated by identical reference numerals; a repetition of the description thereof is omitted.

<<Mass Spectrometer>>

FIG. 1 is a schematic diagram of a mass spectrometer equipped with a mass spectrometry data processor associated with an embodiment. As shown in this figure, the mass spectrometer, generally indicated by reference numeral 1, operates to sequentially mass analyze sample components separated chromatographically. The spectrometer 1 includes a chromatographic separator 101, an ionizer 102, and a mass analyzer 103, as well as a mass spectrometry data processor 100 or 100' according to an embodiment. These components of the instrument are described in detail below.

<Chromatographic Separator 101>

The chromatographic separator 101 is an instrument section for separating a sample under analysis into components. The chromatographic separator 101 has a column for separating a sample under analysis into components. The column is filled with a stationary phase that allows the introduced sample to pass therethrough. Various components of the sample introduced in the column are separated in time according to their speeds in passing through the stationary phase and fed into the ionizer 102 at their intrinsic retention times (RT).

For example, a gas chromatograph is used as the chromatographic separator 101. Note that the chromatographic separator is not limited to this example. The separator may also be a liquid chromatograph or other chromatograph.

<Ionizer 102>

The ionizer 102 operates to successively ionize the sample components which are supplied to the ionizer 102 successively or in turn after separated by the chromatographic separator 101. An ion source using a soft ionization method and an ion source using a hard ionization method can be exchangeably used as the ionizer 102. These ionization methods are described hereinafter.

In the soft ionization method, the molecules of sample components can be ionized without being cleaved. Examples of such soft ionization method include chemical ionization (CI), field ionization (FI), and photoionization (PI) but the ionization method used in the present invention is not restricted to them.

On the other hand, in the hard ionization method, the molecules of sample components can be cleaved to produce ionized fragments. One example of such hard ionization method is electron ionization (EI). Of course, the hard ionization method used in the present invention is not restricted to this.

<Mass Analyzer 103>

The mass analyzer 103 operates to separate the ionized sample components according to mass-to-charge ratio (m/z) and to detect the separated components. The mass analyzer 103 includes a mass separating portion and a detector.

The mass separating portion separates the ions supplied from the ionizer 102 according to mass-to-charge ratio (m/z) and passes only ions of a certain mass-to-charge ratio (m/z) into the detector. In the mass separating portion, the mass-to-charge ratio (m/z) of ions made to reach the detector is scanned such that the ions arrive at the detector in order of their mass-to-charge ratios (m/z). This operation is repeated at regular intervals of time. Although no restriction is imposed on the ion separation method used in the mass separating portion, a time-of-flight (TOF) type is preferably used from the point of view of accuracy at which mass-to-charge ratio (m/z) is detected.

The detector detects the signal intensity (I) of ions separated according to mass-to-charge ratio (m/z) in the mass separating portion and extracts the obtained signal intensity (I) in a corresponding manner to each scan. Consequently, there is derived a mass spectral signal representing the ion signal intensity (I) which is plotted against mass-to-charge ratio (m/z) for each scan.

<Mass Spectrometry Data Processors 100 and 100'>

Mass spectrometry data processors 100 and 100' are instruments associated with different embodiments. Each of these data processors 100 and 100' analyzes a sample to be analyzed on the basis of a mass spectral signal produced from the detector of the mass analyzer 103.

The mass spectrometry data processors 100 and 100' associated with different embodiments and methods for processing of mass spectrometry data implemented by these data processors 100 and 100' are next described in detail.

First Embodiment

<Mass Spectrometry Data Processor>

The mass spectrometer 1 performs two mass analyses on the same sample to thereby produce mass spectral signals. Based on these mass spectral signals, the mass spectrometry data processor 100 according to the first embodiment performs a qualitative analysis of a certain sample component to be analyzed. The first mass analysis is performed when the ionizer 102 implements a soft ionization method. The second mass analysis is performed when the ionizer 102 implements a hard ionization method.

This mass spectrometry data processor 100 includes an input/output controller 10, a data storage section 11, a mass spectrum acquisition section 13, a molecular ion peak detector 15a, a fragment ion peak detector 15b, a composition estimator 17, an assignment validity decision device 19, a degree of coincidence computing section 21, an image data generator 23, a manual control unit 25, and a display unit 27. The configurations of these components are as follows.

Input/Output Controller 10

The input/output controller 10 controls the operational timings of the other components constituting the mass spectrometry data processor 100 according to a preset program and operator's input action made through the manual control unit 25, thereby carrying out processing of mass spectrometry data. The input/output controller 10 is connected with the detector of the mass analyzer 103. As the aforementioned scan is repeated, mass spectral signals are successively produced from the detector and applied to the input/output controller 10 according to the retention time (RT). Processing of mass spectrometry data executed by the input/output controller 10 is described in detail in relation to a method for processing of mass spectrometry data described hereinafter.

Data Storage Section 11

Whenever a mass analysis is performed, a mass spectral signal produced from the detector of the mass analyzer 103 is stored in the data storage section 11 in association with the retention time (RT) based on instructions from the input/output controller 10. A mass analysis is performed twice on the same sample. For each mass analysis, resulting data is stored in the data storage section 11. In the first mass analysis, a soft ionization method is implemented in the ionizer 102. In the second mass analysis, a hard ionization method is practiced in the ionizer 102. Accordingly, for each mass analysis, a mass spectral signal related to the retention time (RT) is stored in the data storage section 11 in association with a sample name and a used mass spectrometry ionization method.

Mass Spectrum Acquisition Section 13

The mass spectrum acquisition section 13 acquires the mass spectral signal detected in a certain retention time (RT) from the mass spectral signals stored in the data storage section 11 based on instructions from the input/output controller 10. In particular, the mass spectrum acquisition section 13 obtains the mass spectral signal detected at the certain retention time (RT) as a mass spectrum from among mass spectral signals extracted in accordance with a normal automatic peak detection (so-called peak search) program. In this automatic peak detection, removal of noise components from a signal of intensity (I) is also carried out automatically. Typically, the noise component removal is performed by subtracting a background level (i.e., an average value of the signal intensity (I) at the tail positions on the right and left sides of a peak top of mass-to-charge ratio (m/z) appearing at each peak position on a TICC) from the signal intensity (I) at the peak top.

Molecular Ion Peak Detector 15a

When a soft ionization method is implemented in the ionizer 102 based on instructions from the input/output controller 10, the molecular ion peak detector 15a detects molecular ion peaks from a first mass spectrum acquired by the mass spectrum acquisition section 13. The molecular ion peak detector 15a detects as a molecular ion peak that peak in the mass spectrum acquired by the mass spectrum acquisition section 13 which produces a signal intensity in excess of a preset threshold value and which has the highest mass-to-charge ratio (m/z). The molecular ion peak detector 15a may execute a program that eliminates isotope peaks. The molecular ion peak detector 15a calculates the center of gravity of the detected peak and stores the position of the calculated center of gravity as the mass-to-charge ratio (m/z) of the molecular ion peak. Alternatively, the molecular ion peak detector 15a may detect as a molecular ion peak that peak of the highest signal intensity which is contained in the mass spectrum derived by the mass spectrum acquisition section 13.

Fragment Ion Peak Detector 15b

When a hard ionization method is implemented in the ionizer 102 based on instructions from the input/output controller 10, the fragment ion peak detector 15b detects a plurality of fragment ion peaks from a second mass spectrum derived by the mass spectrum acquisition section 13. For example, the peak detector 15b sets a threshold value for the signal intensity of the mass spectrum obtained by the mass spectrum acquisition section 13 and detects peaks exceeding the threshold value as fragment ion peaks. The peak detector 15b may execute a program that eliminates isotope peaks.

For each detected fragment ion peak, the fragment ion peak detector 15b computes its center of gravity and stores the position of the computed center of gravity as the mass-to-charge ratio (m/z) of the fragment ion peak.

Composition Estimator 17

Based on instructions from the input/output controller 10, the composition estimator 17 estimates a compositional formula for a molecule that can have the mass-to-charge ratio (m/z) of the molecular ion peak detected by the molecular ion peak detector 15a. Thus, an estimated compositional formula is derived. The estimated compositional formula represents the analyte. Furthermore, based on instructions from the input/output controller 10, the composition estimator 17 estimates compositional formulas respectively for fragments that can have mass-to-charge (m/z) ratios of the fragment ion peaks detected by the fragment ion peak detector 15b, thus obtaining estimated compositional formulas for the fragments.

The processing performed by the composition estimator 17 may be general processing for estimating compositions. In this case, during the above-described estimation of compositional formulas, a given mass range is set for the mass-to-charge ratio (m/z) of each peak, and the compositions of ions of the peaks are estimated within the set mass range. This mass range has values determined using measurement errors of the mass-to-charge ratio (m/z) in the mass spectrometer as a reference.

[Assignment Validity Decision Device 19]

A mass analysis is performed twice on the same sample. For each of these analyses, the assignment validity decision device 19 compares the estimated compositional formulas obtained by the composition estimator 17, makes a decision as to validity of assignment between the compared estimated compositional formulas, converts the result of the decision into numerical values, and stores them in memory. The processing performed by the assignment validity decision device 19 will be described in further detail in relation to the method for processing of mass spectrometry data described below.

Degree of Coincidence Computing Section 21

The degree of coincidence computing section 21 calculates the degree of coincidence of each fragment ion peak for each compositional formula for molecules estimated by the composition estimator 17, based on the result of decision digitized by the assignment validity decision device 19. The processing performed by the degree of coincidence computing section 21 will be described in further detail in relation to the method for processing of mass spectrometry data described below.

Image Data Generator 23

The image data generator 23 generates image data to be displayed on the display unit 27 from various data created by the mass spectrum acquisition section 13, molecular ion peak detector 15a, fragment ion peak detector 15b, composition estimator 17, assignment validity decision device 19, and degree of coincidence computing section 21. Furthermore, the image data generator 23 displays the details of the processing performed by the mass spectrometry data processor 100. In addition, the image data generator 23 creates image data to be displayed on the display unit 27 to permit an operator to select or set images by an operator's input through the manual control unit 25. The image data will be described in greater detail in relation to the method for processing of mass spectrometry data described below.

Manual Control Unit 25

The manual control unit 25 permits the operator to enter various settings regarding data processing performed by the mass spectrometry data processor 100. One example of the various settings regarding data processing is a setting of the retention time (RT) of the mass spectral signal derived by the mass spectrum acquisition section 13. The manual control unit 25 may, for example, be a keyboard, a mouse, or a touch panel controller integral with the display unit 27.

Display Unit 27

The display unit 27 operates to display the image generated by the image data generator 23. The display unit 27 may be equipped with a touch panel controller.

<Method for Processing of Mass Spectrometry Data>

Figure 2:
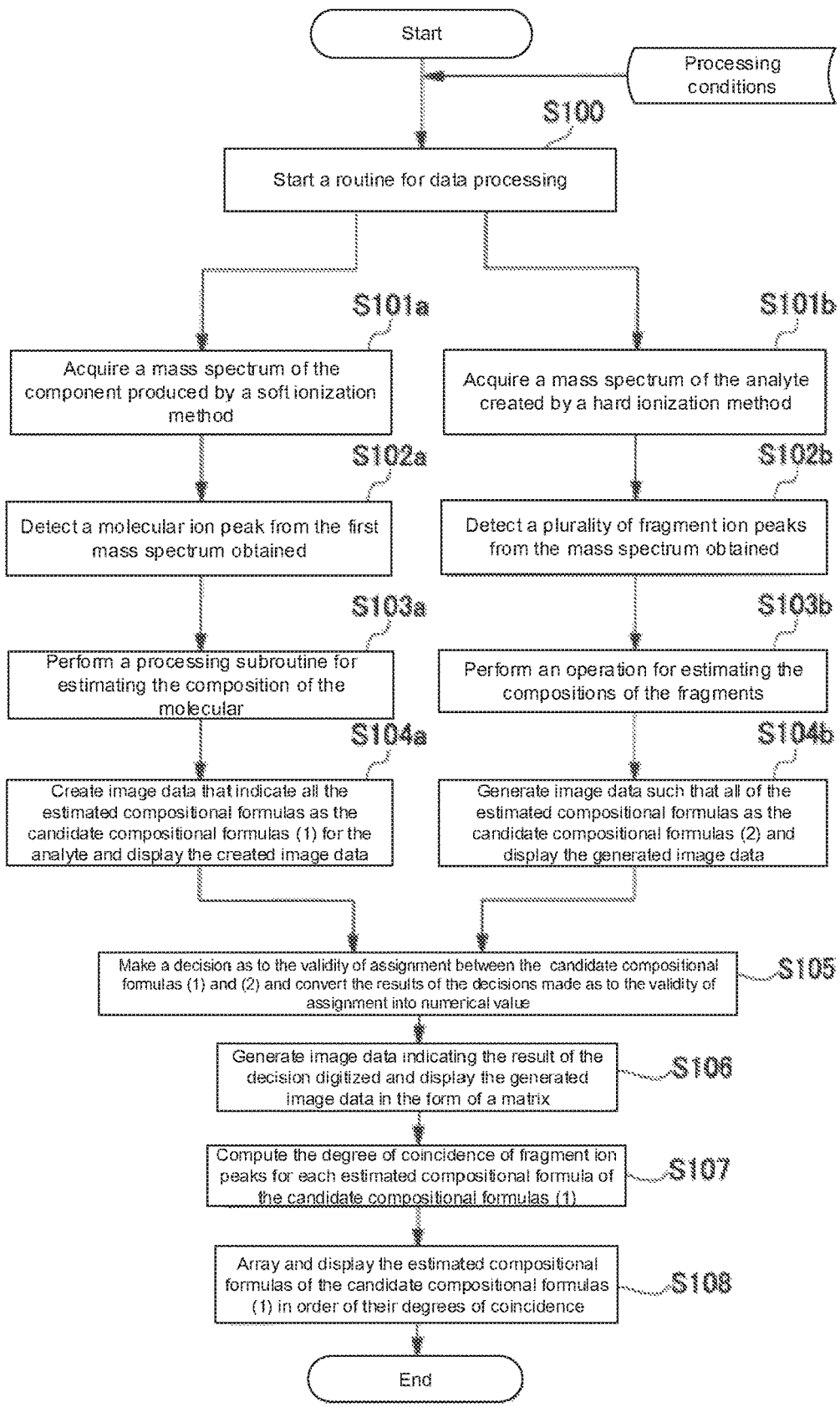
FIG. 2 is a flowchart illustrating a procedure for a method for processing of mass spectrometry data executed by the mass spectrometry data processor according to a first embodiment.

FIG. 2 is a flowchart illustrating a method for processing of mass spectrometry data executed by the mass spectrometry data processor 100 according to the first embodiment. This flowchart depicts the procedure of data processing carried out in accordance with programs preset into various sections of the mass spectrometry data processor 100. The method for processing of mass spectrometry data illustrated in FIG. 2 is a method of performing a qualitative analysis of a certain component included in a sample based on mass spectral signals respectively obtained by two mass analyses on the same sample by means of the mass spectrometer 1 already described in connection with FIG. 1. As described previously, in the first mass analysis, a soft ionization method is implemented in the ionizer 102. In the second mass analysis, a hard ionization method is practiced in the ionizer 102. The method for processing of mass spectrometry data according to the first embodiment is described below by referring to the flowchart of FIG. 2 and also to FIG. 1 and other pertinent figures.

Step S100

In step S100, if settings of processing conditions are entered by the operator through the manual control unit 25, the input/output controller 10 starts a routine for data processing. One example of the entered processing conditions is a retention time (RT) intrinsic to a certain sample component under analysis (analyte), i.e., the retention time (RT) of the analyte subjected to a qualitative analysis. The input/output controller 10 performs a first processing subroutine (steps S101a to S104a) in the left part of FIG. 2 and a second processing subroutine (steps S101b to S104b) in the right part of FIG. 2 in parallel and separately. The subroutines are hereinafter described in turn from the first subroutine.

Step S101a

In step S101a, the mass spectrum acquisition section 13 acquires a mass spectrum of the component which has been produced by a soft ionization method and which is subjected to a qualitative analysis, based on instructions from the input/output controller 10. At this time, the mass spectrum acquisition section 13 selects those of mass spectral signals stored in the data storage section 11 which arise from the sample to be analyzed and for which a soft ionization method has been implemented as a mass spectrometry ionization method. The acquisition section 13 then extracts the mass spectral signal which has been stored in association with the retention time (RT) entered through the manual control unit 25 from the selected mass spectral signals and obtains a mass spectrum consisting of the extracted mass spectral signal as a first mass spectrum.

Figures 3, 4:
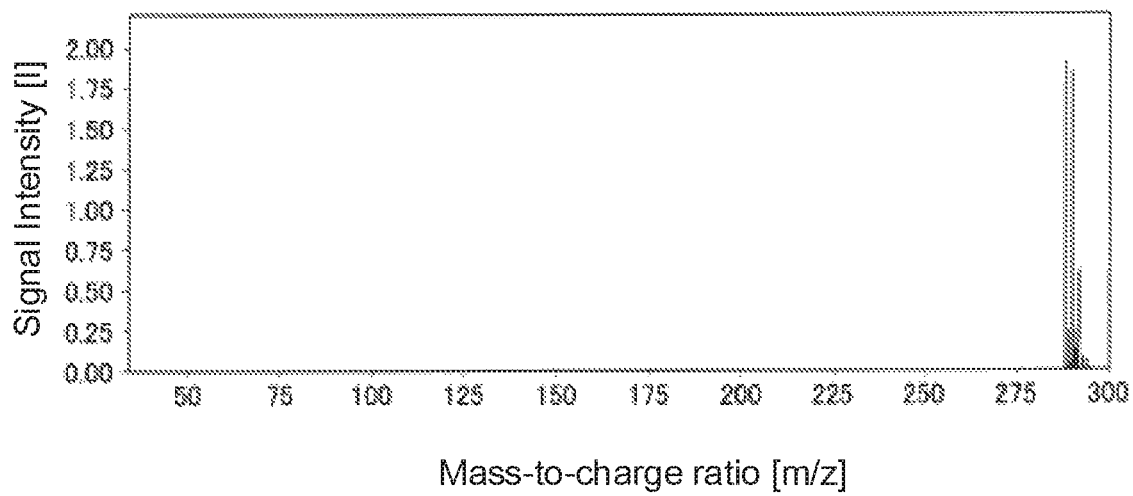
FIG. 3 shows a mass spectrum obtained by application of a soft ionization method for illustrating the first embodiment.
FIG. 4 shows a displayed image or list of candidate compositional formulas (1) for molecules of a sample component under analysis, the candidate list being determined and displayed according to the first embodiment.

FIG. 3 shows one example of mass spectrum obtained by application of a soft ionization method for illustrating the first embodiment. This mass spectrum contains a mass spectral signal originating from molecular ions ionized without cleaving the molecules of the analyte.

Step S102a

In step S102a, the molecular ion peak detector 15a detects a molecular ion peak from the first mass spectrum obtained at step S101a based on instructions from the input/output controller 10. At this time, as described previously, the molecular ion peak detector 15a detects as a molecular ion peak the peak which has a signal intensity in excess of a preset threshold value and the highest mass-to-charge ratio (m/z), and stores the center of gravity of the detected peak as the mass-to-charge ratio (m/z) of the molecular ion peak. In the example shown in FIG. 3, the highest peak in the vicinity of mass-to-charge ratio (m/z)=285 is detected as a molecular ion peak. The center of gravity ((m/z)=287.94912) of the detected highest peak is computed. The computed center of gravity is stored as the mass-to-charge ratio (m/z) of the molecular ion.

Step S103a

In step S103a, the composition estimator 17 performs a processing subroutine for estimating the composition of the molecule based on instructions from the input/output controller 10. At this time, the composition estimator 17 estimates in a manner described above all possible compositional formulas for the molecule which can result in the mass-to-charge ratio (m/z) of the molecular ion peak detected at step S102a, thus providing estimated compositional formulas. These estimated compositional formulas are estimated compositional formulas for the analyte.

Step S104a

In step S104a, the image data generator 23 creates image data that indicate all the estimated compositional formulas obtained at step S103a as candidate compositional formulas (1) for the analyte and displays the created image data on the display unit 27. At this time, the image data generator 23 generates image data indicating the mass-to-charge ratios (m/z) of the molecular ion peaks corresponding to the estimated compositional formulas and displays the generated image data on the display unit 27 together with the estimated compositional formulas of the candidate compositional formulas (1) for the analyte, for example, as shown in FIG. 4.

Step S101b

On the other hand, at step S101b, the mass spectrum acquisition section 13 acquires a mass spectrum of the analyte created by a hard ionization method, based on instructions from the input/output controller 10. At this time, the mass spectrum acquisition section 13 selects those of mass spectral signals stored in the data storage section 11 which arise from the sample to be analyzed and for which a mass spectrometry ionization method has been effected. Then, the acquisition section 13 extracts that mass spectral signal from the selected mass spectral signals which has been stored in association with the retention time (RT) entered via the manual control unit 25, and obtains a mass spectrum consisting of the extracted mass spectral signal as a second mass spectrum.

Figure 5:
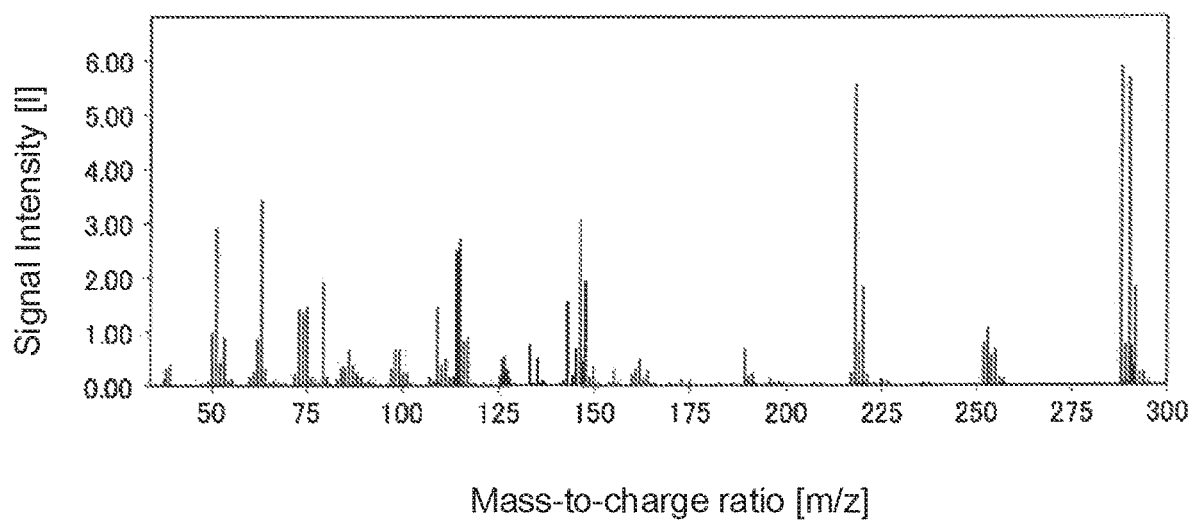
FIG. 5 shows one example of mass spectrum obtained by application of a hard ionization method for illustrating the first embodiment.

FIG. 5 shows one example of mass spectrum obtained by application of a hard ionization method for illustrating the first embodiment. This mass spectrum contains mass spectral signals originating from multiple fragment ions which have been ionized by cleavage of the molecules of the analyte.

Step S102b

In step S102b, the fragment ion peak detector 15b detects a plurality of fragment ion peaks from the mass spectrum obtained at step S101b based on instructions from the input/output controller 10. At this time, as described previously, the peak detector 15b eliminates isotope peaks, sets a threshold value, detects fragment ion peaks, and stores the center of gravity of each detected fragment ion peak as its mass-to-charge ratio (m/z).

Step S103b

In step S103b, the composition estimator 17 performs an operation for estimating the compositions of the fragments based on instructions from the input/output controller 10. At this time, the composition estimator 17 obtains the estimated compositional formulas by estimating, as noted above, all compositional formulas for the fragments which can produce the mass-to-charge ratios (m/z) of the fragment ion peaks detected at step S102b. The obtained estimated compositional formulas are estimated compositional formulas for fragments resulting from cleavage of the molecules of the analyte.

Step S104b

In step S104b, the image data generator 23 generates image data such that all of the estimated compositional formulas obtained at step S103b are indicated as candidate compositional formulas (2) by the generated image data, and displays the generated image data on the display unit 27. At this time, the image data generator 23 creates image data indicating the estimated compositional formulas of the candidate compositional formulas (2) for the fragments resulting from cleavage of the analyte as well as the mass-to-charge ratios (m/z) of the fragment ion peaks corresponding to the estimated compositional formulas, and displays the generated image data on the display unit 27, for example, as shown in FIG. 6. As shown in the candidate compositional formulas (2) of FIG. 6, estimated compositional formulas for one or more fragments are obtained in a corresponding manner to one fragment ion peak and its mass-to-charge ratio (m/z).

Step S105

Figure 7:
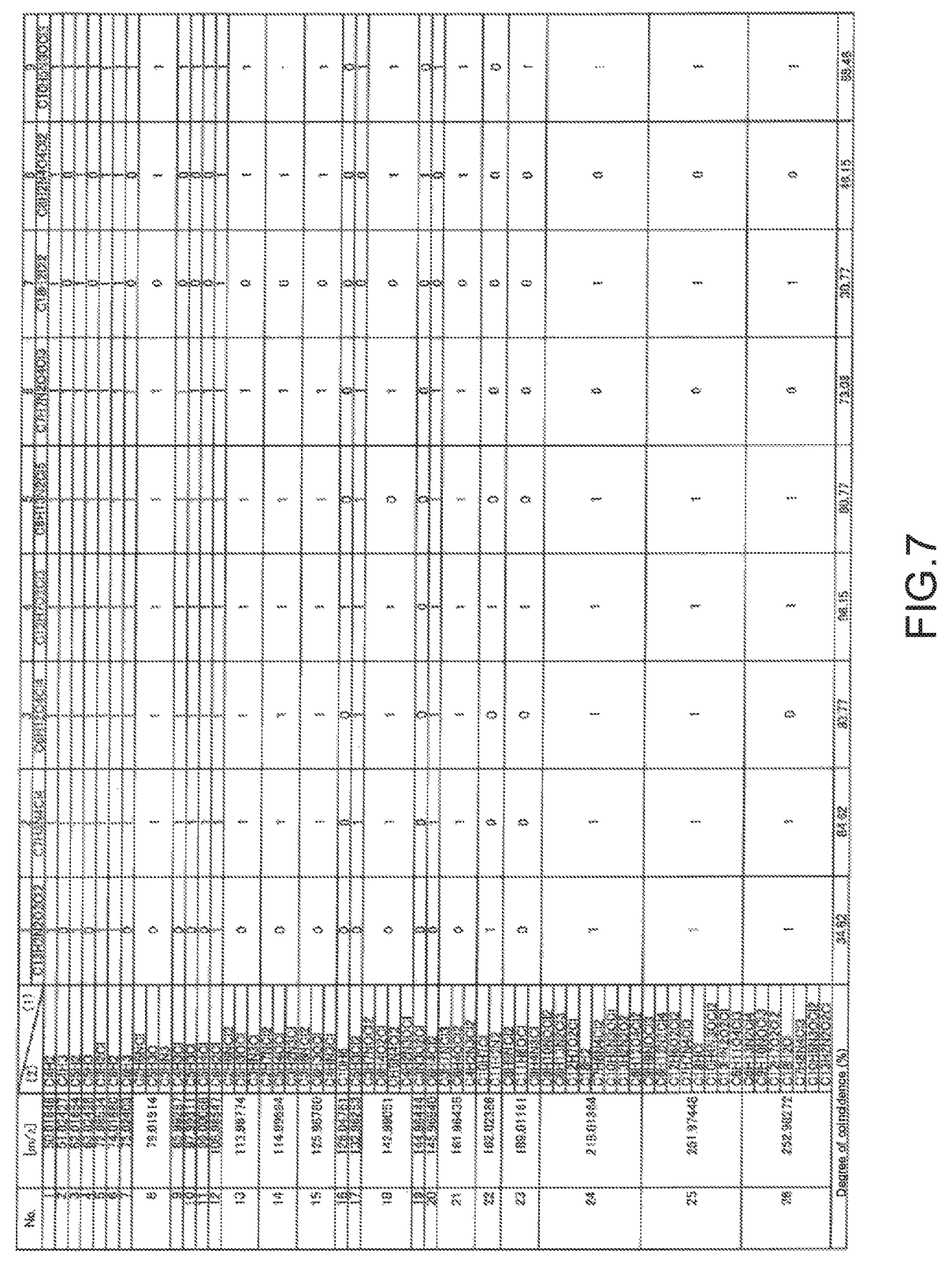

In step S105, if steps S104a and S104b are both performed, the input/output controller 10 causes the assignment validity decision device 19 to make a decision as to the validity of assignment between the candidate compositional formulas (1) and (2). FIG. 7 shows one example of the results of decisions made as to the validity of assignment of the candidate compositional formulas (2) to the candidate compositional formulas (1) in the first embodiment. As shown in this figure, the assignment validity decision device 19 compares all the estimated compositional formulas of the candidate compositional formulas (1) for the molecule shown at step S104a with all the estimated compositional formulas of the candidate compositional formulas (2) shown at step S104b for all the combinations. Then, the decision device 19 makes a decision as to the validity of the assignment of each compared estimated compositional formula, converts the results of the decisions into numerical values, and stores them.

The decision made by the assignment validity decision device 19 as to the validity of assignment depends on whether the types of elements and the number of atoms of one estimated compositional formula out of the candidate compositional formulas (2) for fragments are contained within the ranges of types of elements and of the number of atoms of one estimated compositional formula out of the candidate compositional formulas (1). If they are contained without problems, it is determined that the assignments are possible. If there is any problem, it is determined that the assignments are impossible.

At this time, if it is determined that at least one of the estimated compositional formulas for the plural fragments obtained from one fragment ion peak out of the candidate compositional formulas (2) for fragments can be assigned to one estimated compositional formula out of the candidate compositional formulas (1) for the analyte, the assignment validity decision device 19 determines that the assignments are possible. The decision device 19 converts the results of the decisions made as described so far as to the validity of assignments into numerical values and stores them in memory.

In this case, if it is determined as one example that the assignments are possible as illustrated in FIG. 7, "1" is attached to the combination of the estimated compositional formulas. On the other hand, if it is determined that the assignments are impossible, "0" is attached to the combination of the estimated compositional formulas.

Step S106

In step S106, the image data generator 23 generates image data indicating the result of the decision digitized at step S105 according to instructions from the input/output controller 10 and displays the generated image data in the form of a matrix on the display unit 27. One example of this display is shown in the above-cited FIG. 7.

[Step S107]

In step S107, for each estimated compositional formula of the candidate compositional formulas (1), the degree of coincidence computing section 21 computes the degrees of coincidence of fragment ion peaks based on the result of decision digitized at step S105 according to instructions from the input/output controller 10. At this time, the degree of coincidence computing section 21 calculates the ratio of the fragment ion peaks having the estimated compositional formulas judged to be assignable at step S105 to the total number of fragment ion peaks, the ratio being defined to be the degree of coincidence of the fragment ion peaks.

With respect to the estimated compositional formula No. 1 of the candidate compositional formulas (1) exemplified, for example, in FIG. 7, the total number of fragment peaks is 26. The number of fragment ion peaks having estimated compositional formulas judged to be assignable is 9. The degree of coincidence is calculated to be 9/26×100=34.62%. In the lowermost row of FIG. 7, the computed degrees of coincidence are also shown.

Step S108

In step S108, the image data generator 23 arrays the estimated compositional formulas of the candidate compositional formulas (1) in order of their degrees of coincidence computed at step S107, generates image data also indicating the degrees of coincidence, and displays them on the display unit 27, according to instructions from the input/output controller 10. FIG. 8 shows one example of displayed image or list that represents the results of computations of the degrees of coincidence according to the first embodiment. That is, FIG. 8 shows the degrees of coincidence computed in accordance with the procedure described thus far. Thus, the routine for processing of mass spectrometry data is ended.

Advantages of First Embodiment

In the first embodiment described so far, the degrees of coincidence of each estimated compositional formula for the sample component to be analyzed (analyte) with the fragments originating from the analyte are computed from a mass spectrum generated by mass spectrometry utilizing a soft ionization method and from a mass spectrum generated by mass spectrometry utilizing a hard ionization method. Consequently, one appropriate estimated compositional formula can be selected easily from a plurality of estimated compositional formulas obtained regarding the analyte, by referring to the computed degrees of coincidence even in general mass spectrometry other than tandem mass spectrometry.

Because estimated compositional formulas for the analyte are arranged in order of the values of the degree of coincidence computed by the degree of coincidence computing section 21 and displayed together with the degrees of coincidence on the display unit 27 as shown also in FIG. 8, if there are only small variations among the degrees of coincidence, the operator can easily select an appropriate estimated compositional formula from among a plurality of estimated compositional formulas while taking account of the degrees of coincidence and other factors.

Furthermore, as shown in FIG. 7, the results of decisions made by the assignment validity decision device 19 are displayed in the form of a matrix on the display unit 27 for all the combinations of the estimated computational formulas for the analyte and the estimated compositional formulas for the fragments. This makes it possible to select an appropriate one from among a plurality of estimated compositional formulas obtained from the analyte while referring to the fragments constituting the analyte. In addition, it is possible to know the validity of assignments of the fragment ion peaks to the estimated compositional formulas and so the presence or absence of components different from the analyte can be confirmed.

Second Embodiment

<Mass Spectrometry Data Processor>

The mass spectrometry data processor 100' of FIG. 1 according to the second embodiment is similar to the mass spectrometry data processor 100 according to the first embodiment except for the configuration of its input/output controller, 10'. The manner in which the operational timings of various other instrument components are controlled by the program in the input/output controller 10' are described below in relation to the method for processing of mass spectrometry data.

<First Method for Processing of Mass Spectrometry Data>

Figure 9:
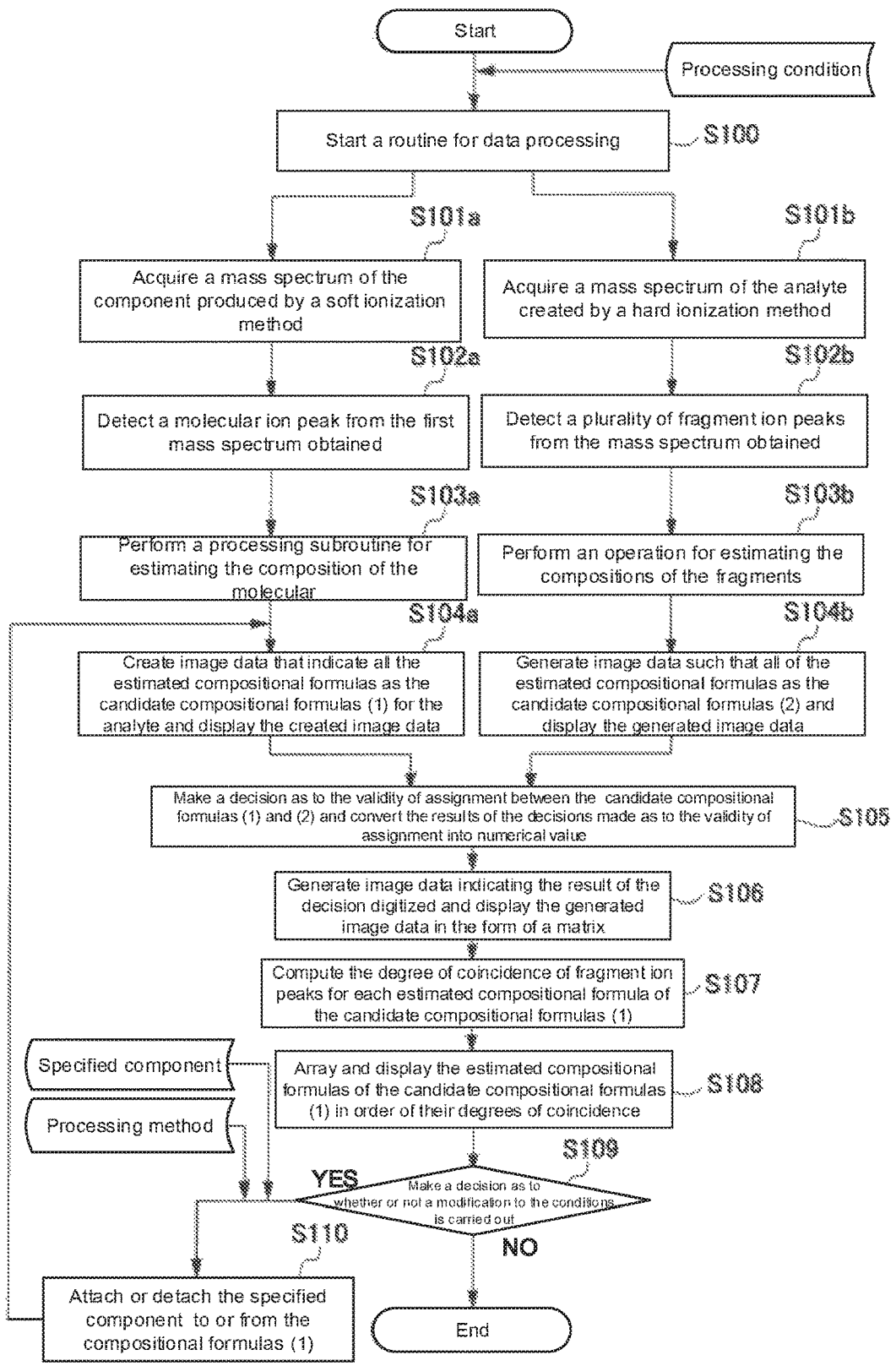
FIG. 9 is a flowchart illustrating a procedure for processing of mass spectrometry data performed by a mass spectrometry data processor according to a second embodiment.

FIG. 9 is a flowchart illustrating a procedure of processing of mass spectrometry data performed by the mass spectrometry data processor 100' according to the second embodiment. The data processing is effected according to programs preset into various portions of the mass spectrometry data processor 100'. The procedure of the mass spectrometry data processing (FIG. 9) according to the second embodiment is similar to the procedure of the mass spectrometry data processing (FIG. 2) according to the first embodiment except that steps S109 and S110 are performed after step S108. A repetition of the description of the steps S100 to S108 is omitted here; the following description centers on the steps S109 and S110.

Steps S100 to S108

Steps S100 to S108 are identical to the steps described in the first embodiment and carried out in the same manner as in the first embodiment.

Step S109

In step S109, the input/output controller 10' makes a decision as to whether or not a modification to the conditions is carried out. At this time, the input/output controller 10' displays an image, for example, on the display unit 27 to prompt the operator to make a decision as to whether or not a modification to the data processing conditions is selected. If the operator enters an input through the manual control unit 25 to select a modification to the data processing conditions, the decision is YES, indicating that a modification to the conditions is carried out, and control goes to step S110. On the other hand, if the operator enters an input through the manual control unit 25 not to select a modification to the data processing conditions, the decision is NO, indicating that the conditions are not modified, and the processing subroutine is ended.

FIGS. 10, 11A, 11B, 12, 13, 14A, 14B, 15A, and 15B show mass spectra obtained by the processing of the above steps S100 to S108 and one example of image displayed on the display unit 27. The processing of the above-described steps S100 to S108 illustrate a case where it is difficult to determine compositional formulas.

Figures 10, 11A, 11B:
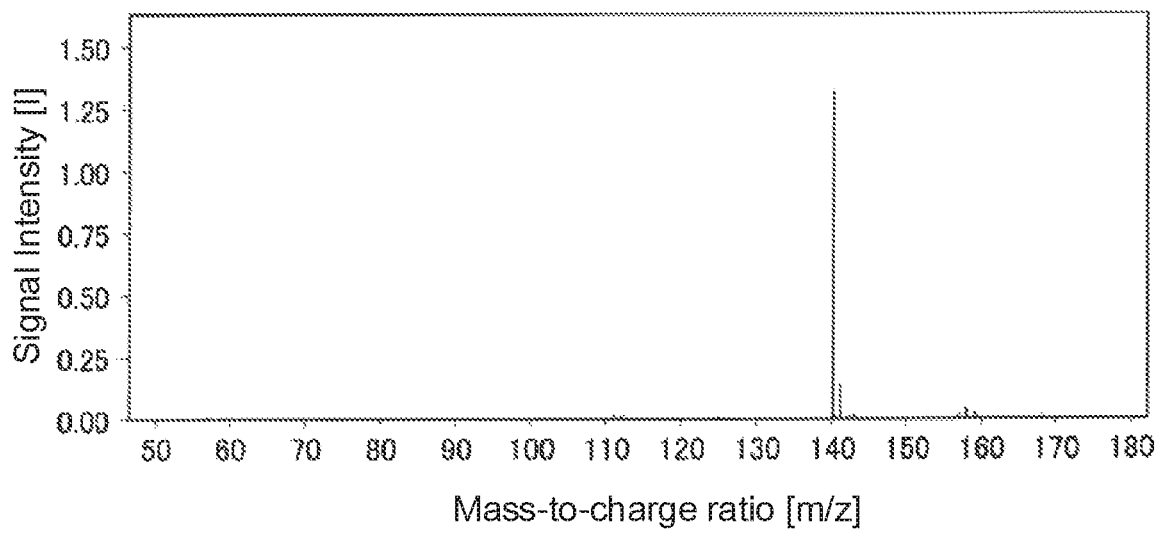
FIG. 10 shows one example of mass spectrum obtained by application of a soft ionization method for illustrating the second embodiment.
FIGS. 11A and 11B show examples of displayed images or lists of candidate compositional formulas (1) for molecules of a sample component under analysis, the candidate lists being determined and displayed according to the second embodiment.

FIG. 10 shows one example of mass spectrum obtained by application of a soft ionization method for illustrating the second embodiment. This mass spectrum is one example of the first mass spectrum derived at the aforementioned step S101a. FIGS. 11A and 11B show one example of displayed images indicating the candidate compositional formulas (1) for molecules of the analyte according to the second embodiment. Of these figures, FIG. 11A shows an estimated compositional formula for the analyte, the formula being obtained by performing the processing of steps S102a to S104a based on the mass spectrum of FIG. 10.

Figures 12, 13:
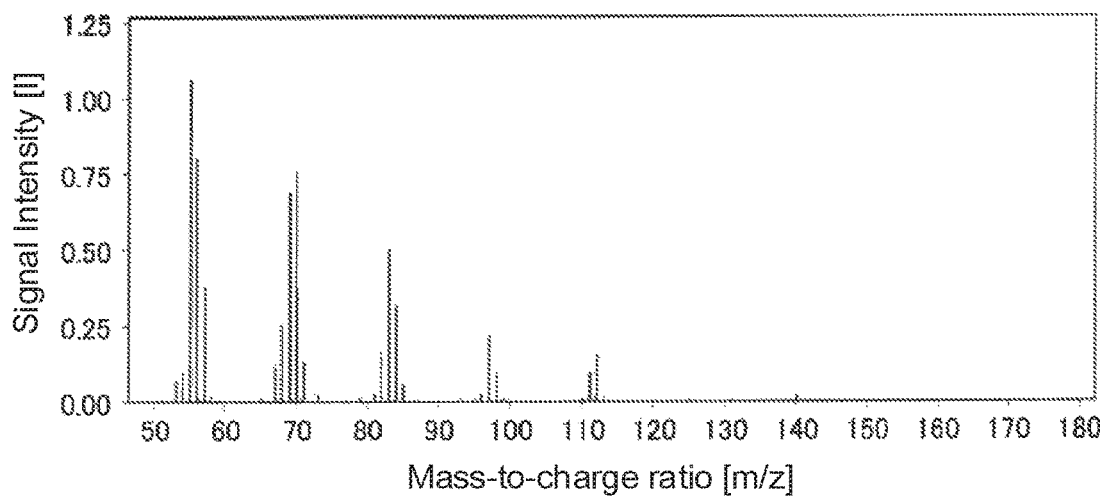
FIG. 12 shows one example of mass spectrum obtained by application of a hard ionization method for illustrating the second embodiment.
FIG. 13 shows one example of displayed image or list of candidate compositional formulas (2) for fragments, the candidate list being determined and displayed according to the second embodiment.

On the other hand, FIG. 12 shows one example of mass spectrum obtained by application of a hard ionization method for illustrating the second embodiment. This mass spectrum is one example of the second mass spectrum derived at the above-described step S101*b*. FIG. 13 shows one example of displayed image or list indicative of the candidate compositional formulas (2) for fragments according to the second embodiment, and gives estimated compositional formulas for fragments obtained by performing the processing of steps S102*b* to S104*b*, based on the mass spectrum of FIG. 12.

FIGS. 14A and 14B show one example of the results of a decision made as to the validity of the assignments of the candidate compositional formulas (2) to the candidate compositional formulas (1) in the second embodiment and indicates the result of step S105. FIG. 14A shows the result of a decision made as to the validity of the assignments of the estimated compositional formulas of the candidate compositional formulas (2) shown in FIG. 13 to the estimated compositional formulas of the candidate compositional formulas (1) shown in FIG. 11A.

FIGS. 15A and 15B show one example of displayed images or lists indicative of the results of computations of degrees of coincidence in the second embodiment. FIG. 15A shows the results of computations of the degrees of coincidence obtained by performing the processing sequence of steps S107 to S108 based on the results of decisions shown in FIG. 14A. As can be seen from FIG. 15A, in the processing sequence of steps S100 to S108, the degrees of coincidence computed using the estimated compositional formulas of the candidate compositional formulas (1) are identical in value. Therefore, it is difficult to determine the compositional formula for the analyte from this result.

In this case, the operator enters an input through the manual control unit 25 while viewing the result of FIG. 15A displayed at step S108 to select a modification to the data processing conditions. Consequently, in the present step S109, the input/output controller 10' determines that the conditions are modified (YES), and control proceeds to step S110.

Step S110

In step S110, if the operator enters a specified component and a processing method through the manual control unit 25, the input/output controller 10' attaches or detaches the specified component. The entered component is a component attached or detached to or from each estimated compositional formula of the candidate compositional formulas (1) of FIG. 11A displayed at step S104*a*. This component is an appropriate component specified and entered by the operator. The processing method entered at this time consists of attaching or detaching (removing) the specified component to or from the compositional formulas of the candidate compositional formulas (1) of FIG. 11A displayed at step S104*a*. The operator selects and enters either processing step (attaching step or detaching step).

An example is now given in which the operator considers that $H_2O$ has been detached from the analyte when the component is ionized by a soft ionization method. In this case, the operator enters $H_2O$ as a specified component through the manual control unit 25 and enters an attaching step as a processing method.

In the present step S110, the input/output controller 10' adds the specified component $H_2O$ to the estimated compositional formulas of the candidate compositional formulas (1) displayed at step S104*a* in response to the specified component and processing method entered via the manual control unit 25, thus creating new estimated compositional formulas. Then, control returns to step S104*a*.

In the next step S104*a*, the image data generator 23 generates image data that represent all new estimated compositional formulas created at step S110 as new candidate compositional formulas (1) for the analyte, and displays the image data on the display unit 27. FIG. 11B shows the new candidate compositional formulas (1) for the analyte, the new formulas being displayed on the display unit 27. The candidate compositional formulas (1) displayed at this time are the estimated compositional formulas of the candidate compositional formulas (1) of FIG. 11A displayed at the previous step S104*a* to which estimated formulas the specified component $H_2O$ has been added.

As a result of the processing sequence of the following steps S105 to S106, the result of the decision as to the validity of assignments of the candidate compositional formulas (2) to the new candidate compositional formulas (1) are displayed on the display unit 27 as shown in FIG. 14B. Also, as a result of the processing sequence of the following steps S107 to S108, the computed degrees of coincidence with the new candidate compositional formulas (1) are displayed on the display unit 27 as shown in FIG. 15B.

The operator can select the single estimated compositional formula having a degree of coincidence of 100% as a compositional formula for the analyte from the results of FIG. 15B displayed at step S108. However, if the operator determines from this result that it is still difficult to determine a compositional formula for the analyte, then a modification to the data processing conditions can be selected again by entering an input via the manual control unit 25.

<Second Method for Processing of Mass Spectrometry Data>

Another example of the implementation of the method for processing of mass spectrometry data according to the second embodiment which has been described by referring to the flowchart of FIG. 9 is next described. This example is another case where it is difficult to determine a compositional formula using the processing sequence of the above-described steps S100 to S108.

Steps S101 to S108

Steps S101 to S108 are identical to the steps described in the first embodiment and carried out in the same way as in the latter steps.

Step S109

In step S109, the input/output controller 10' makes a decision as to whether a modification to the conditions is carried out in the same way as in the aforementioned step S109.

FIGS. 16, 17A, 17B, 18, 19, 20A, 20B, 21A and 21B show examples of the mass spectrum obtained by the processing sequence of the above-described steps S100 to S108 and examples of the image displayed on the display unit 27. Another example is herein given in which it is difficult to determine a compositional formula with the processing sequence of the steps S100 to S108.

Figures 16, 17A, 17B:
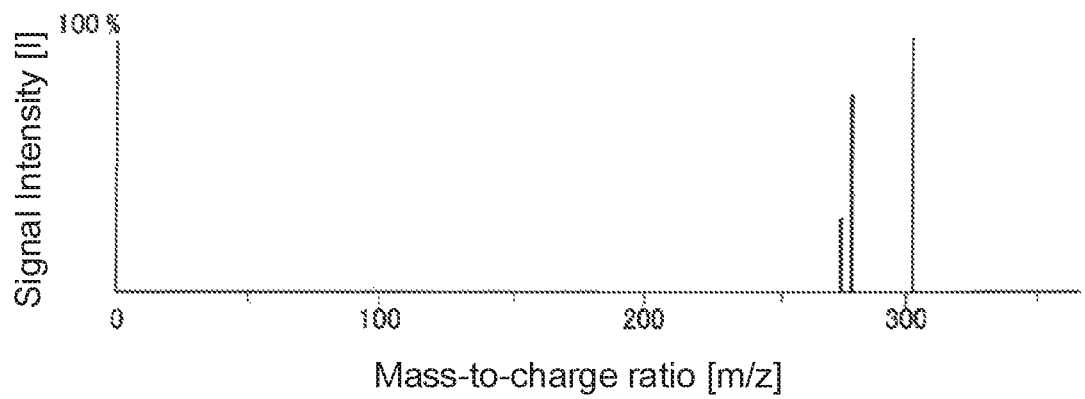
FIG. 16 shows another example of mass spectrum obtained by a soft ionization method for illustrating the second embodiment.
FIGS. 17A and 17B show other examples of displayed images or lists of candidate compositional formulas (1) for a certain sample component under analysis, the candidate lists being determined and displayed according to the second embodiment.

FIG. 16 shows another example of the mass spectrum obtained by a soft ionization method for illustrating the second embodiment. This mass spectrum is another example of the first mass spectrum derived at the previous step S101*a*. FIGS. 17A and 17B show other examples of the displayed or lists indicative of candidate compositional formulas (1) for a certain analyte according to the second embodiment. FIG. 17A shows an estimated compositional formula for the analyte, the formula being obtained by carrying out the processing sequence of steps S102*a* to S104*a*, based on the mass spectrum of FIG. 16.

Figures 18, 19:
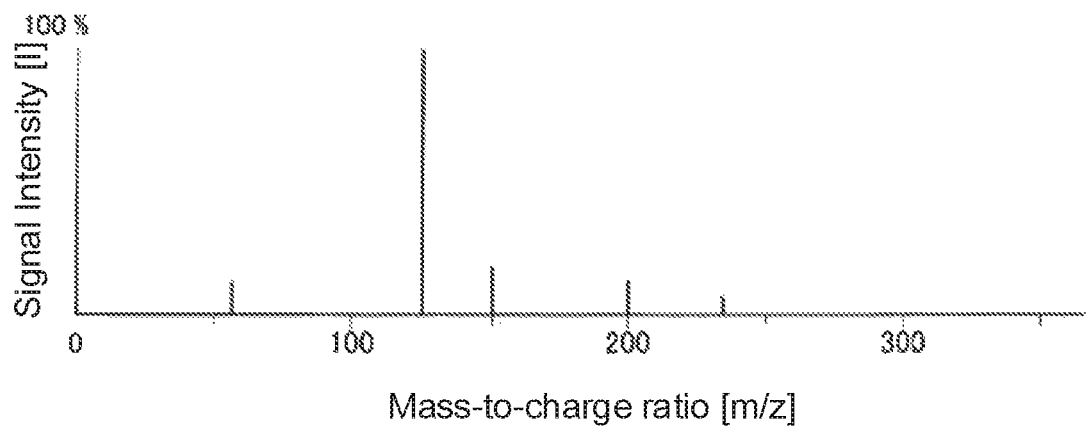
FIG. 18 shows another example of mass spectrum obtained by application of a hard ionization method for illustrating the second embodiment.
FIG. 19 shows another example of displayed image or list of candidate compositional formulas (2) for fragments, the list being determined and displayed according to the second embodiment.

On the other hand, FIG. 18 shows another example of the mass spectrum obtained by application of a hard ionization method, illustrating the second embodiment. This mass spectrum is one example of the second mass spectrum derived at the previously described step S101b. FIG. 19 shows another example of the displayed image indicative of candidate compositional formulas (2) for fragments according to the second embodiment, and depicts estimated compositional formulas for the fragments obtained by carrying out the processing sequence of steps S102b to S104b, based on the mass spectrum of FIG. 18.

FIGS. 20A and 20B show further examples of the results of decision as to the validity of the assignments of the candidate compositional formulas (2) to the candidate compositional formulas (1) according to the second embodiment, and depicts the results of the execution of step S105. FIG. 20A shows the results of the decisions of the validity of the assignments of the estimated compositional formulas of the candidate compositional formulas (2) shown in FIG. 19 to the estimated compositional formulas of the candidate compositional formulas (1) shown in FIG. 17A.

FIGS. 21A and 21B show further examples of the displayed images indicative of the computed degrees of coincidence according to the second embodiment. FIG. 21A shows the computed degrees of coincidence obtained by performing the processing sequence of steps S107 to S108 based on the results of the decisions shown in FIG. 20A. As can be seen from FIG. 21A, in the processing sequence of steps S100 to S108, the computed degrees of coincidence for the compositional formulas of the candidate compositional formulas (1) are all identically equal to 100%. It is difficult to determine a compositional formula for the analyte from this result.

In this case, the operator views the result of FIG. 21A displayed at step S108 and makes an input through the manual control unit 25 to select a modification to the data processing conditions. Consequently, in the present step S109, the input/output control unit 10' determines that a modification to the data processing conditions is selected (YES) and control goes to step S110.

Step S110

In step S110, if the operator enters a specified component and a processing method through the manual control unit 25, the input/output controller 10' carries out a step of attaching or detaching the specified component in the same manner as in the step S110 already described.

As a further example, it is assumed that the operator considers that $C_2H_5$ is added to the analyte when various components are ionized, for example, by a soft ionization method and that the operator enters $C_2H_5$ as a specified component and enters a removing step as a processing method through the manual control unit 25.

In the present step S110, the input/output controller 10' creates a new estimated compositional formula from which the specified component $C_2H_5$ has been detached, for each estimated compositional formula of the candidate compositional formulas (1) displayed at step S104a in response to the specified component and processing method entered through the manual control unit 25. Then, control returns to step S104a.

In the next step S104a, the image data generator 23 generates image data indicating all new estimated compositional formulas created at step S110 as new candidate compositional formulas (1) for the analyte and displays the generated image data on the display unit 27. FIG. 17B shows the new candidate compositional formulas (1) for the analyte, the candidates being displayed on the display unit 27.

The candidate compositional formulas (1) displayed at this time are the estimated compositional formulas of the candidate compositional formulas (1) of FIG. 17A displayed at the previous step S104a from which the specified component $C_2H_5$ has been eliminated.

As a result of the processing sequence of the following steps S105 to S106, the results of decisions as to the validity of assignments of the candidate compositional formulas (2) to the new candidate compositional formulas (1) are displayed on the display unit 27 as shown in FIG. 20B. As a result of the processing sequence of the following steps S107 to S108, computed degrees of coincidence with the new candidate compositional formulas (1) are displayed on the display unit 27 as shown in FIG. 21B.

The operator can select the estimated compositional formula having a sole degree of coincidence of 100% as a compositional formula for the analyte from the results of FIG. 21B displayed at step S108. However, if the operator judges that it is still difficult to determine a compositional formula for the analyte based on the results, the operator can again select a modification to the data processing conditions by making an input through the manual control unit 25.

Advantages of Second Embodiment

The second embodiment described so far can yield further advantages compared with the first embodiment because of the addition of the steps S109 and S110. In particular, if there is a possibility of attachment or detachment of other components to or from the analyte when the analyte is mass analyzed using a soft ionization method because of the results obtained by execution of the steps S100 to S108, additional data processing designed taking account of this possibility can be performed. Consequently, a compositional formula for the analyte can be derived with greater accuracy.

In the description of the second embodiment provided so far, steps S109 and S110 are performed after step S108. Alternatively, the steps S109 and S110 may be performed after step S104a. In this case, the operator enters a specified component and a processing method through the manual control unit 25 while referring to the mass spectrum obtained at step S101a and the display provided at step S104a.

In the first and second embodiments described so far, the present invention is described as a method of data processing both the mass spectrum obtained by mass spectrometry using a soft ionization method and the mass spectrum obtained by mass spectrometry using a hard ionization method. The present invention is also applicable to data processing of mass spectra obtained by tandem mass spectrometry. In this case, mass spectra (product ion spectra) obtained by mass separating fragment ions produced from a collision cell may be used instead of mass spectra produced by mass spectrometry utilizing a hard ionization method as described in the first and second embodiments.

The invention claimed is:

1. A mass spectrometry data processor for performing a qualitative analysis of a sample component based both on a first mass spectrum and a second mass spectrum of the sample component, said mass spectrometry data processor comprising:
a molecular ion peak detector for detecting one molecular ion peak from said first mass spectrum;
a fragment ion peak detector for detecting a plurality of fragment ion peaks from said second mass spectrum;
wherein the mass spectrometry data processor is configured to:

obtain estimated compositional formulas for the sample component from said one molecular ion peak by estimating candidate compositional formulas that can have the mass-to-charge ratio of the molecular ion peak of the first mass spectrum measured and detected by a soft ionization method without cleaving the molecules of the sample component;

obtain estimated compositional formulas for fragments constituting said sample component from said fragment ion peaks by estimating candidate compositional formulas of fragments that can have the mass-to-charge ratio of each fragment ion peak of the second mass spectrum measured and detected by a hard ionization method;

make decisions as to whether the estimated compositional formulas for the fragments of each mass-to-charge ratio can be assigned to the estimated compositional formulas for the sample component depending on whether types of elements and a number of atoms of the estimated compositional formulas for the fragments of each mass-to-charge ratio is contained within ranges of types of elements and of a number of atoms of the estimated compositional formulas for the sample component; and compute a ratio of the fragment ion peaks having the estimated compositional formulas judged to be assignable to a total number of fragment ion peaks, as degrees of coincidence of the estimated compositional formulas for the fragments with the estimated compositional formulas for the sample component.

2. The mass spectrometry data processor as set forth in claim 1, wherein if the mass spectrometry data processor determines that at least one of the estimated compositional formulas for the fragments obtained from said fragment ion peaks can be assigned to said estimated compositional formulas for the sample component, then the mass spectrometry data processor is configured to determine that the fragment ion peaks can be assigned to the estimated compositional formulas for the sample component.

3. The mass spectrometry data processor as set forth in claim 1, wherein the mass spectrometry data processor is further configured to:

generate image data for arraying said estimated compositional formulas for the sample component in order of their degrees of coincidence and display the generated image data together with said degrees of coincidence; and wherein the mass spectrometry data processor comprises:
a display unit for displaying said estimated compositional formulas for said sample component and said degrees of coincidence in response to the image data.

4. The mass spectrometry data processor as set forth in claim 3, wherein the mass spectrometry data processor is further configured to generate image data for displaying results of the decisions in the form of a matrix on said display unit such that the matrix represents every combination of the estimated compositional formulas for the sample component and the estimated compositional formulas for the fragments.

5. The mass spectrometry data processor as set forth in claim 1, further comprising:

a manual control unit permitting one to enter both a specified component to be attached or detached to or from said estimated compositional formulas for said sample component and a processing method of processing the specified component in conformity with the estimated compositional formulas for the sample component; and an input/output controller operative to attach or detach said specified component to or from said estimated compositional formulas for the sample component in response to an input from the manual control unit to thereby form new estimated compositional formulas for the sample component, wherein the mass spectrometry data processor is configured to make decisions using the new estimated compositional formulas for the sample component and the estimated compositional formulas for the fragments.

6. A method for processing of mass spectrometry data to perform a qualitative analysis of a sample component based both on a first mass spectrum and a second mass spectrum of the sample component, said method comprising the steps of:

detecting one molecular ion peak from the first mass spectrum;

detecting a plurality of fragment ion peaks from the second mass spectrum;

obtaining estimated compositional formulas for the sample component from the molecular ion peak by estimating candidate compositional formulas that can have the mass-to-charge ratio of the molecular ion peak of the first mass spectrum measured and detected by a soft ionization method without cleaving the molecules of the sample component;

obtaining estimated compositional formulas for fragments constituting the sample component from the fragment ion peaks by estimating candidate compositional formulas of fragments that can have the mass-to-charge ratio of each fragment ion peak of the second mass spectrum measured and detected by a hard ionization method;

making a decision as to whether the estimated compositional formulas for the fragment of each mass-to-charge ratio can be assigned to the estimated compositional formulas for the sample component depending on whether types of elements and a number of atoms of the estimated compositional formulas for the fragments of each mass-to-charge ratio is contained within ranges of types of elements and of a number of atoms of the estimated compositional formulas for the sample component; and computing the ratio of the fragment ion peaks having the estimated compositional formulas judged to be assignable in the decision step to the total number of fragment ion peaks, as degrees of coincidence of the estimated compositional formulas for the fragments with the estimated compositional formulas for the sample component.

* * * * *